(12) United States Patent
Anderson et al.

(10) Patent No.: US 7,757,231 B2
(45) Date of Patent: Jul. 13, 2010

(54) SYSTEM AND METHOD TO DEPRIVILEGE COMPONENTS OF A VIRTUAL MACHINE MONITOR

(75) Inventors: Andrew V. Anderson, Hillsboro, OR (US); Steven M. Bennett, Hillsboro, OR (US); Erik Cota-Robles, Portland, OR (US); Alain Kägi, Portland, OR (US); Gilbert Neiger, Portland, OR (US); Rajesh S. Madukkarumukumana, Portland, OR (US); Sebastian Schoenberg, Hillsboro, OR (US); Richard Uhlig, Hillsboro, OR (US); Michael A. Rothman, Puyallup, WA (US); Vincent J. Zimmer, Federal Way, WA (US); Stalinselvaraj Jeyasingh, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1348 days.

(21) Appl. No.: 11/008,911

(22) Filed: Dec. 10, 2004

(65) Prior Publication Data
US 2006/0130060 A1 Jun. 15, 2006

(51) Int. Cl.
*G06F 9/455* (2006.01)
*G06F 9/46* (2006.01)
(52) U.S. Cl. .................. 718/1; 718/100; 718/108
(58) Field of Classification Search ................. 718/100, 718/1, 108; 717/100; 714/38
See application file for complete search history.

(56) References Cited
U.S. PATENT DOCUMENTS
4,787,031 A * 11/1988 Karger et al. ............... 718/100

5,437,033 A * 7/1995 Inoue et al. ................ 714/10
2002/0143842 A1* 10/2002 Cota-Robles et al. ......... 709/1

(Continued)

FOREIGN PATENT DOCUMENTS
JP 2001-318797 11/2001

(Continued)

OTHER PUBLICATIONS
Hall et al. "Virtualizing the VAX architecture", Proceedings of the 18th annual international symposium on Computer architecture (ISCA '91).*

(Continued)

*Primary Examiner*—Meng-Ai An
*Assistant Examiner*—Willy W Huaracha
(74) *Attorney, Agent, or Firm*—Hanley, Flight & Zimmerman, LLC (57) ABSTRACT

In some embodiments, the invention involves a system to deprivilege components of a virtual machine monitor and enable deprivileged service virtual machines (SVMs) to handle selected trapped events. An embodiment of the invention is a hybrid VMM operating on a platform with hardware virtualization support. The hybrid VMM utilizes features from both hypervisor-based and host-based VMM architectures. In at least one embodiment, the functionality of a traditional VMM is partitioned into a small platform-dependent part called a micro-hypervisor (MH) and one or more platform-independent parts called service virtual machines (SVMs). The micro-hypervisor operates at a higher virtual machine (VM) privilege level than any SVM, while the SVM and other VMs may still have access to any instruction set architecture (ISA) privilege level. Other embodiments are described and claimed.

21 Claims, 5 Drawing Sheets

U.S. PATENT DOCUMENTS

| | | | | |
|---|---|---|---|---|
| 2004/0003324 | A1* | 1/2004 | Uhlig et al. | 714/38 |
| 2005/0076186 | A1* | 4/2005 | Traut | 712/1 |
| 2005/0076324 | A1* | 4/2005 | Lowell et al. | 717/100 |

FOREIGN PATENT DOCUMENTS

WO        03/104981        12/2003

OTHER PUBLICATIONS

Fraser et al "Safe Hardware Access with the Xen Virtual Machine Monitor", Proceedings of the 1st Workshop on Operating System and Architectural Support for the On demand IT InfraStructure (OASIS), Oct. 2004.*

Hall et al. "Virtualizing the VAX architecture" Proceedings of the 18th annual international symposium on Computer architecture (ISCA '91) pp. 380-389.*

Liedtke, Jochen, "Toward Real Microkernels," Communications of the ACM, vol. 39, No. 9, pp. 70-77 (Sep. 1996).

European Patent Office, International Search Report and Written Opinion for International Application No. PCT/US2005/044701, 10 pages, May 4, 2006.

Judith S. Hall et al., "Virtualizing the VAX Architecture," ACM SIGARCH Computer Architecture News, vol. 19, No. 3, pp. 380-389, May 1991.

Keir Fraser et al., "Safe Hardware Access with the Xen Virtual Machine Monitor," in Proceedings of the First Workshop on Operating System and Architectural Support for the On Demand IT Infrastructure (OASIS-2004), 10 pages, Oct. 2004.

John Scott Robin et al., "Analysis of the Pentium's Ability to Support a Secure Virtual Machine Monitor," in Proceedings of the 9th Usenix Security Symposium, 16 pages, Aug. 2000.

Paul Barham et al., "Xen and the Art of Virtualization," in Proceedings of the ACM Symposium on Operating Systems Principles, vol. 37, No. 5, pp. 164-177, Oct. 2003.

Office Action issued in Japanese Patent Application No. 2007-545682, issued Mar. 10, 2010, 24 pages.

Translation of Office Action issued in Japanese Patent Application No. 2007-545682, issued Mar. 10, 2010, 3 pages.

* cited by examiner

SYSTEM AND METHOD TO DEPRIVILEGE COMPONENTS OF A VIRTUAL MACHINE MONITOR

FIELD OF THE INVENTION

An embodiment of the present invention relates generally to virtualization platforms and, more specifically, to a system and method to run components of a virtual machine monitor at a reduced privilege level.

BACKGROUND INFORMATION

Various mechanisms exist for managing virtual machines in a virtualization platform. One management technique is to deploy a virtual machine monitor (VMM) on the system. There are two common architectures for virtual machine monitors. The first is a hypervisor architecture, in which a privileged hypervisor (virtual machine monitor) controls all other software in a system. The hypervisor must contain native drivers and models for all devices which it wishes to provide to software running in virtual machines (VMs) (referred to herein as guest VMs). This necessity has been a problem with this architecture of VMM. In the hypervisor architecture, the VMM has full control over the underlying platform, and may limit guest VM access to the platform hardware. The hypervisor has access to all of the hardware. A guest VM may directly access the hardware only if the hypervisor permits it. A hypervisor system may prevent guest VMs from accessing the hardware directly, if designed to do so. When the hypervisor is implemented, device drivers for each physical device must also be implemented. If the physical device changes (e.g., it is replaced by a different version of the device) then a new or replacement device driver must be present in the hypervisor. Typically, all operating systems run in VMs. The VMs may be privileged in different ways. For example, VM1 may have access to device #1 while VM2 has access to device #2.

The second common architecture for a VMM is a hosted VMM. In this architecture, the VMM is tied intimately to a hosting operating system (OS) and uses the services provided by the hosting OS to perform its virtualization functions. In this architecture, the hosting OS has full control over the platform; the VMM component has control of the platform's guest VMs. In other words, the VMM component does not directly control the underlying hardware. The VMM accesses the underlying hardware using the services provided by the hosting OS. The stability of the VMM is only as good as that of the hosting OS. The hosting OS contains all of the necessary device drivers. The VMM must implement models for all devices presented to the guest VMs. VMMs implemented with this high-level architecture suffer portability constraints because of their reliance on a particular hosting OS. Additionally, there is a reliance on the hosting OS to perform scheduling. The VMM controls scheduling of the guest VMs, but it does not control how much time it is given by the hosting OS. For instance, it may not be possible to request that the hosting OS awaken the VMM every millisecond.

Some virtualization products exist today. For instance, a hypervisor-based architecture, ESX Server, is available from VMware®, Inc. Microsoft® and VMware®, Inc. both provide host-based architecture software: Microsoft offers VirtualPC and VirtualServer, and VMWare® offers VMWorkstation and GSX Server. Currently, these software systems may be loaded on a server or personal computer (PC) that does not have hardware virtualization support.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to deprivileging components of a virtual machine monitor and enabling deprivileged service virtual machines (SVMs) to provide selected functionality. An embodiment of the present invention provides a means by which a virtual machine monitor (VMM) may be constructed for higher portability and reliability. An embodiment of the invention is a hybrid VMM, using features from both hypervisor-based and host-based VMM architectures. In at least one embodiment, the functionality of a traditional VMM may be partitioned into a small platform-dependent part called a micro-hypervisor (MH) and one or more platform-independent parts called service virtual machines (SVMs). This hybrid VMM architecture provides development, validation, security, reliability, and availability benefits over existing VMM software architectures.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In embodiments of the invention, the micro-hypervisor is a module which serves to proxy request between virtual machines (VMs), including SVMs, and enforces isolation and security policies. Design of the micro-hypervisor requires inherent platform knowledge and access to privileged resources (e.g., the platform chipset, etc). The micro-hypervisor runs in the most privileged mode, as will be discussed below with respect to FIGS. 2A-B. The micro-hypervisor may be implemented as a module which is loaded early in system boot (similar to an OS module), launched as a driver from a hosting OS, or as part of the system firmware.

Figure 2A:
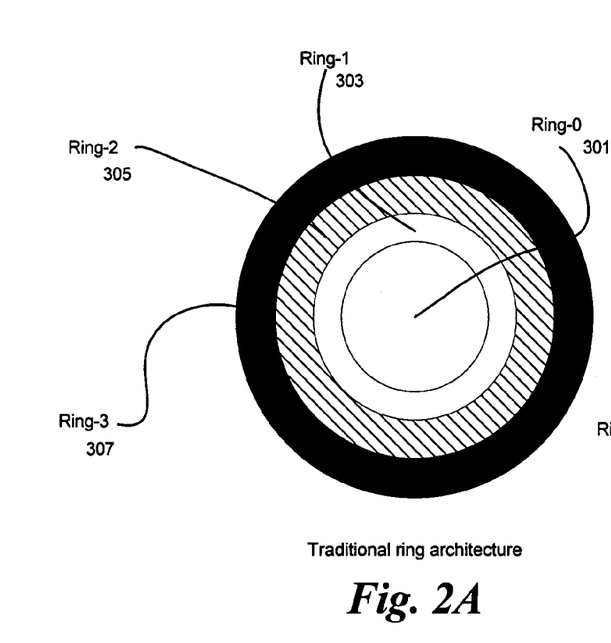
FIGS. 2A-B illustrate the various privilege levels in an IA-32 architecture platform and a platform with hardware virtualization support, according to an embodiment of the invention.
Figure 2B:
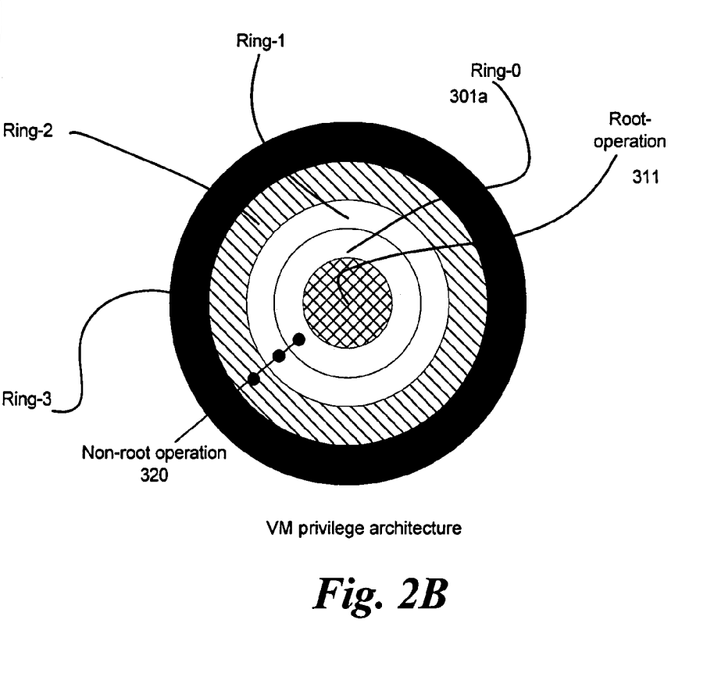

SVMs are platform independent modules which run in a deprivileged mode in a VM, as will be discussed with respect to FIGS. 2A-B. SVMs may be built around off-the-shelf OSs and device drivers, or one or more platform-independent firmware modules. The SVMs may provide services such as device virtualization, proxying of requests to actual hardware or to other SVMs.

Figure 1:
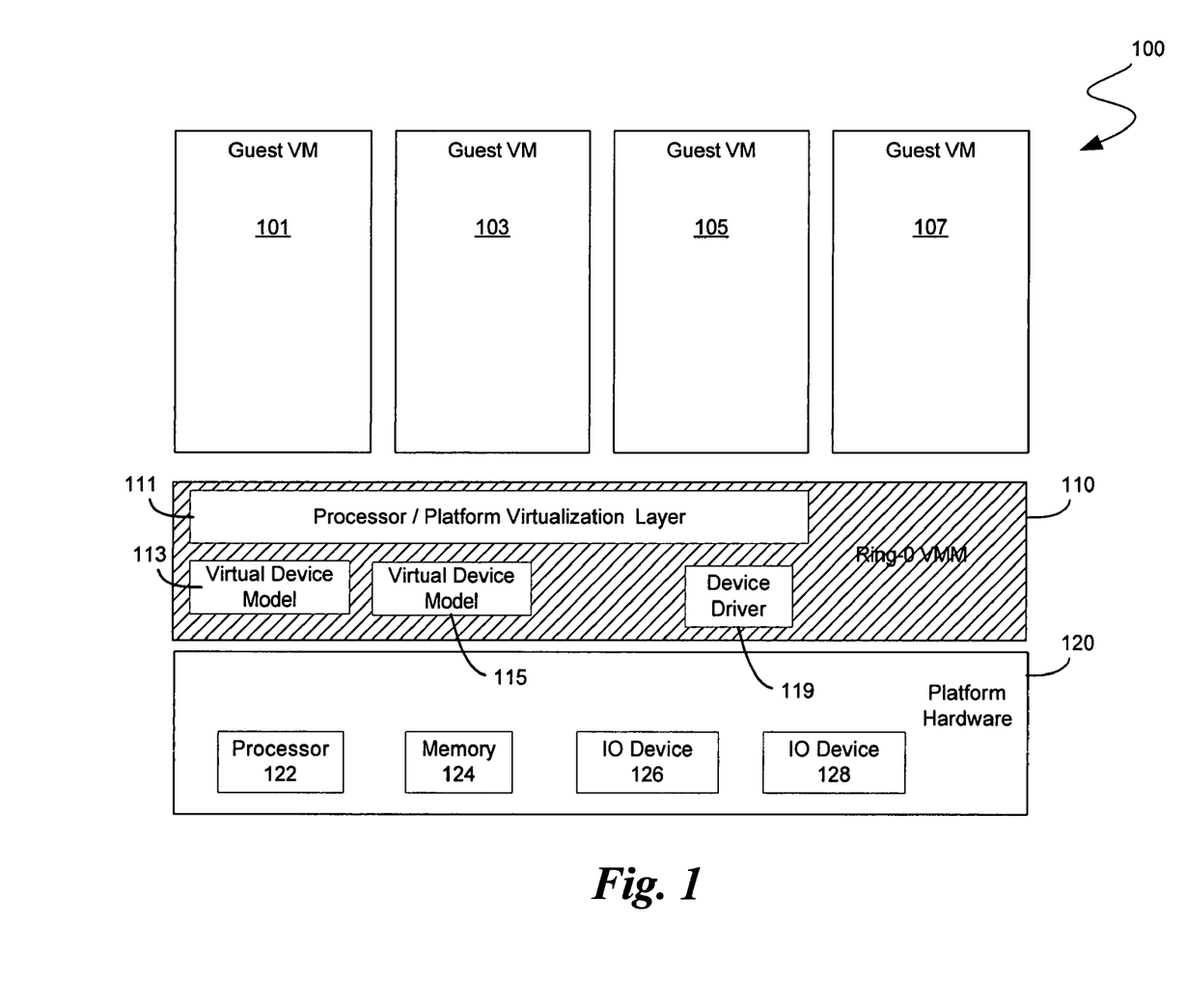
FIG. 1 is a block diagram illustrating a traditional hypervisor virtual machine monitor (VMM) architecture platform.

FIG. 1 is a block diagram illustrating traditional hypervisor VMM architecture platform 100. A number of guest VMs 101, 103, 105, and 107 may be running on the platform 100 at the same time. A virtual machine monitor (VMM) 110 controls the guest VMs' access to the hardware 120 via the processor/platform virtualization layer 111. A number of virtual device models 113 and 115 may exist within the VMM 110. The VMM 110 may operate at the highest privilege level, as will be discussed below with respect to FIGS. 2A-B. The VMM 110 controls access to the file system, memory and all devices, as discussed further below. The VMM 110 typically has a device driver 119 for each hardware device on the platform.

The VMM 110 and guest VMs 101, 103, 105 and 107 execute on platform hardware 120. The platform hardware 120 may include a processor 122, memory 124 and one or more I/O devices 126 and 128. The platform hardware 120 may be a personal computer (PC), mainframe, handheld device, portable computer, set top box, or any other computing system.

Processor 122 may be any type of processor capable of executing software, such as a microprocessor, digital signal processor, microcontroller, or the like. Though FIG. 1 shows only one such processor 122, there may be one or more processors in platform hardware 120 and one or more of the processors may include multiple threads, multiple cores, or the like.

Memory 124 may be a hard disk, a floppy disk, random access memory (RAM), read only memory (ROM), flash memory, or any other type of medium readable by processor 122. Memory 124 may store instructions for performing the execution of method embodiments of the present invention.

The one or more I/O devices 126 and 128 may be, for example, network interface cards, communication ports, video controllers, disk controllers on system buses (e.g., Peripheral Component Interconnect (PCI), Industry Standard Architecture (ISA), Advanced Graphics Port (AGP)), devices integrated into the chipset logic or processor (e.g., real-time clocks, programmable timers, performance counters), or any other device on the platform hardware 120. The one or more I/O devices 126 and 128 may be accessed through I/O instructions, or memory mapped I/O accesses or through any other means known in the art.

Most instruction set architectures (ISAs), including the ISA of the Intel Pentium® 4 (herein referred to as the IA-32 ISA), are designed with the concept of privilege levels in the instruction set architecture; these privilege levels are referred to herein as ISA privilege levels. Referring to FIGS. 2A and 2B, there is shown a block diagram illustrating platforms with various ISA privilege levels. The IA-32 ISA, for example, has four ISA privilege levels, referred to as ring levels ring-0 301, ring-1 303, ring-2 305 and ring-3 307. In the IA-32 ISA, ring-0 (301) is the most privileged ISA privilege level while ring-3 (307) is the least privileged ISA privilege level.

ISA privilege levels are used by OSs to partition functionality between user mode and kernel mode. In existing systems, processor instruction set architectures typically are designed to give the OS code full control over the hardware, i.e. ring-0 mode 301. The ISA enables the OS to create containers for other software to run at lower ISA privilege levels, i.e., ring-1 (303), ring-2 (305), and ring-3 (307). Generally, in existing systems, OS code runs at the highest ISA privilege level (i.e., ring-0 301)) and applications run at the lowest ISA privilege level (i.e., ring-3 (307)). Device drivers typically run at the highest ISA privilege level in existing OSs such as Microsoft® Windows™. In existing OSs, more and more code is being run at the highest ISA privilege level. As the size of the code which is executed at the highest ISA privilege level grows, the complexity of possible interactions within the code and the validation complexity of the code grows. This growth may lead to more system crashes due to faulty software. Additionally, existing systems suffer from a lack of well-defined interfaces between components and poor enforcement of the use of any defined interfaces.

The general approach of utilizing a small privileged core and deprivileged service components has been attempted in some systems. For example, microkernel OS research (see "Toward Real Microkernels" by Jochen Liedtke, September 1996/Vol. 39, No. 9 COMMUNICATIONS OF THE ACM) has attempted to apply a similar scheme to depriviliging parts of the OS. A microkernel is a very small, fully privileged portion of an OS. Since the fully privileged portion uses ring-0 (in IA-32 terms), the remainder of the OS must be deprivileged to allow the microkernel to be alone at the highest ISA privilege level. The OS must be modified to cope at a lower ISA privilege level.

A microkernel separates the components of the operation system by moving them into containers operating at a lower ISA privilege level so that the components in separate containers cannot directly influence each other or influence the operation of the microkernel. Some microkernels have been implemented in existing systems, but they are slow and complex and are not developed for a virtualization platform.

When a platform has hardware virtualization support, a new way to partition privilege into two privilege-spaces may be introduced. The first privilege space is ISA privilege levels, as described above. The second privilege space is referred to herein as VM privilege level. In an embodiment, there are two VM privilege levels. The highest VM privilege level is referred to as root operation (311) while the lower VM privilege level is referred to as non-root operation (320). In an embodiment, the VMM or micro-hypervisor runs in root operation 311. Guest VMs run in non-root operation 320. The software running at a higher VM privilege level may control the software running at a lower VM privilege level, regardless of the ISA privilege level of the software running at the lower VM privilege level. In an embodiment, software at any VM privilege level may utilize the processor's ISA privilege level architecture (e.g., ring-0 (301a) in the IA-32 ISA). However, ring-0 software running at a lower VM privilege level (e.g., non-root operation 320) may still be controlled by software running at a higher VM privilege level (e.g., root operation 311).

In an embodiment, VM privilege levels and ISA privilege levels for a given process are independent, i.e., components of the VMM may run in the highest VM privilege level and also at the lowest ISA privilege level. The capabilities of VMM code executing at the highest VM privilege level but at a reduced ISA privilege level (e.g., ring-3 in the IA-32 ISA) may be limited in its ability to directly control or manipulate the state of guest software running at a lower VM privilege level. These limitation may be placed by the virtualization architecture (e.g., the hardware may prevent the reduced ISA privilege level code from starting a new VM) or by the highest ISA privilege level code running at the highest VM privilege level (e.g., by configuring page tables of the lower ISA privilege level code from accessing memory of guest software).

Figure 3:
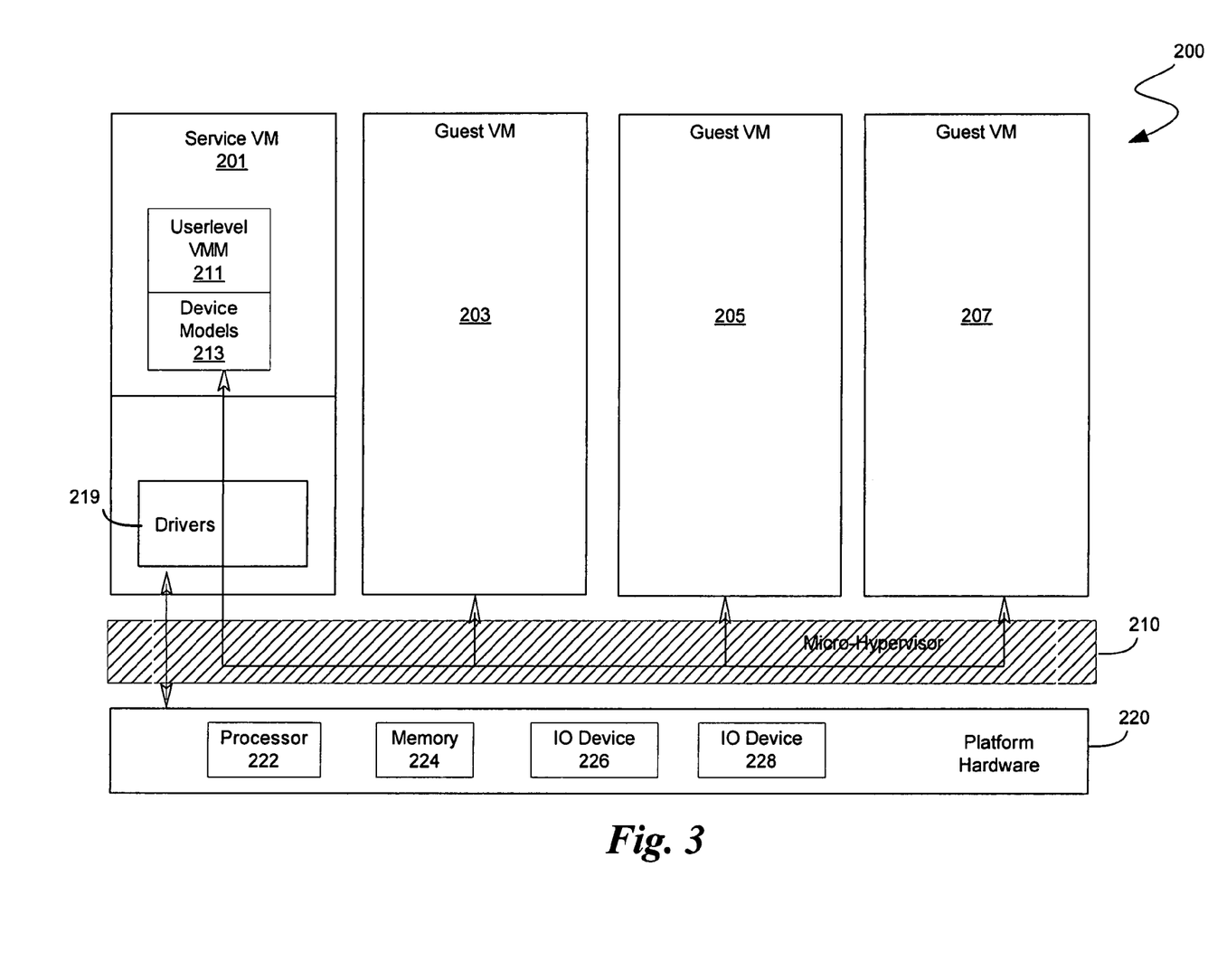
FIG. 3 is a block diagram illustrating a hybrid architecture VMM, according to an embodiment of the invention.

FIG. 3 is a block diagram illustrating a hybrid architecture VMM, according to embodiments of the invention. A hybrid architecture VMM uses elements from both hypervisor-based and host-based VMM architectures. The VMM of FIG. 1 (110) and the micro-hypervisor 210 run at the highest VM privilege level and have full control over the platform hardware 120 and 220, respectively.

The hybrid architecture may utilize one or more service virtual machines (SVMs) such as SVM 201. The SVM 201 may comprise a user-level VMM 211 and device models 213. The device models 213 in the SVM 201 may interact with hardware drivers 219, also in the SVM 201. The hardware drivers 219 communicate to the platform hardware 220 under control of the micro-hypervisor 210, as will be discussed below. Though FIG. 3 shows only one such SVM 201, there may be one or more SVMs in the system 200, as will be discussed below.

The micro-hypervisor 210, service VM 201 and guest VMs 203, 205 and 207 execute on platform hardware 220. The platform hardware 220 may include a processor 222, memory 224 and one or more I/O devices 226 and 228. The platform hardware 220 may be of a personal computer (PC), mainframe, handheld device, portable computer, set top box, or any other computing system.

Processor 222 may be any type of processor capable of executing software, such as a microprocessor, digital signal processor, microcontroller, or the like. Though FIG. 3 shows only one such processor 222, there may be one or more processors in platform hardware 220 and one or more of the processors may include multiple threads, multiple cores or the like.

Memory 224 may be a hard disk, a floppy disk, random access memory (RAM), read only memory (ROM), flash memory, or any other type of machine medium readable by processor 222. Memory 224 may store instructions for performing the execution of method embodiments of the present invention.

The one or more I/O devices 226 and 228 may be, for example, network interface cards, communication ports, video controllers, disk controllers on system buses (e.g., PCI, ISA, AGP), devices integrated into the chipset logic or processor (e.g., real-time clocks, programmable timers, performance counters) or any other device on the platform hardware 220. The one or more I/O devices 226 and 228 may be accessed through I/O instructions, or memory mapped I/O accesses or through any other means known in the art.

In an embodiment, the micro-hypervisor 210 has full access to and control of the platform hardware 220. In existing host-based and hypervisor-based VMM architectures, device drivers in the VMM may run in a fully privileged mode and therefore, device accesses and other services are higher risk operations. In the hybrid architecture, as described herein, the SVM 201 does not run at a fully privileged level, and therefore services and device accesses pose a lower risk to platform integrity. The SVM 201 may provide device drivers, file systems and all services, but these features are to be performed in a depriviledged mode, within a VM. A SVM 201 serves some of the same purpose that a host OS serves in the host-based architecture, but within a VM instead of directly on a host. The benefits of running portions of the VMM at a reduced VM privilege level are present even if the reduced VM privilege level portion of the VMM runs at the highest ISA privilege level (e.g., ring-0 in the IA-32 ISA).

In an embodiment of the hybrid architecture, there is no host OS controlling the system and services. Instead, a small micro-hypervisor controls critical services running at the highest VM-privilege level and one or more SVMs may provide other services running at a lower VM privilege level. For instance, the SVMs may provide services for hardware interactions. The SVMs may have limited access to the underlying hardware. For example, SVM may have access limited to only the hardware devices which it controls. Thus, hardware control may be compartmentalized to ensure that rogue applications have no unauthorized access to hardware devices.

An embodiment of the present invention allows existing OSs to run in guest VMs without modification and still provide the interfaces and services to applications expected by the user. All of the services may now run through the micro-hypervisor which calls the appropriate SVM to handle the service. In an embodiment of the invention, this is possible because a higher VM privilege level (i.e., root operation 311 from FIG. 2) is implemented on the platform hardware. The IBM 370 model computer, for instance, is a virtualization platform that would support embodiments of the invention.

A VMM may either allow or prevent a guest VM from accessing any particular element of the platform directly, including memory, I/O devices, DMA engines, etc. The micro-hypervisor may give the guest VM access to certain resources. For example, there may be a SVM providing storage services that has access to at least one storage device (i.e., a disk drive). With platform extensions, the SVM which has been given access to such a storage device, for instance, may be prevented from accessing other hardware devices on the platform.

In an embodiment, the SVMs run at the same VM privilege level as the guest VMs. However, the micro-hypervisor may provide a SVM the ability to access components of the underlying hardware platform that are not accessible to all VMs. The micro-hypervisor uses mechanisms in the virtualization platform to prevent a VM from accessing specific hardware devices or memory. All accesses to a particular I/O port, for instance, may cause a transition to the micro-hypervisor.

The hardware architecture of some platforms is unable to prevent direct memory accesses (DMAs) from referencing all of physical memory. If a VM is given access to a device which can perform DMA, the device may be programmed to perform DMA anywhere in memory.

In one embodiment, the hardware architecture may provide a mechanism by which a VMM may specify pages in physical memory that are inaccessible to DMA. Thus, pages may be protected from all devices. Accesses coming from the CPU bus may not be blocked, however. This may protect against errant or malicious devices.

In another embodiment, the hardware architecture may provide a mechanism by which a VMM may specify pages in physical memory that are inaccessible by DMA on a per-device basis, allowing the VMM to grant DMA access from a particular device to certain pages of physical memory but not to others.

Hardware support for virtualization may include a variety of facilities for use by a VMM. In one embodiment, the VMM software may specify events which may occur while a guest VM is running which will cause transitions back into the VMM. The transition from a guest VM to the VMM is referred to as a VM exit. The transition from the VMM to a guest VM is referred to as VM entry. In an embodiment, a VM entry is initiated by a VMM by executing a specific processor instruction. The hardware enables the platform to transition back and forth between a highest privileged mode (i.e., a high VM privilege level) and a lesser privileged, or "deprivileged" mode (i.e., a lower VM privilege level) based on policies set by the VMM. The set of events which may be specified by the VMM to cause VM exits may be broad. Events may include, but are not limited to, all of the events which a VMM may use to virtualize physical memory (i.e., the VMM may control the guests VMs' page tables), interrupts and exceptions, I/O instructions, accesses to certain processor state such as machine specific registers (MSRs) and control registers (e.g., CR0 in the IA-32 ISA), and the like. In this way, the VMM may virtualize certain platform functionality.

For example, if an OS running in a guest VM performs an I/O instruction, the VMM may trap that event by specifying that this I/O event causes a transition using VM exit to the VMM (i.e., privileged mode). In an embodiment, the VMM may specify which I/O port accesses should cause VM exits, allowing a guest VM to access some I/O ports while preventing access to other ports. When such a VM exit occurs, the VMM may virtualize the I/O devices or provide services and perform the necessary I/O. This may be transparent to the guest VM. In an embodiment of the invention, the micro-hypervisor, running at the highest VM privilege level, may proxy the request for the service to a SVM, running at a lower VM privilege level. The SVM then provides the service, for instance, to access a storage device.

In an embodiment, the virtualization platform may control operation of software running at a reduced VM privilege level according to data in a control structure, referred to as a virtual machine control structure (VMCS). The VMCS includes a set of controls that specifies for each type of event, whether it should cause a transition to the VMM. For instance, for I/O port accesses, there is a bit that the VMM may set or clear for each of the I/O ports that are accessible on an IA-32 platform. There is a list of the ports that may or may not be accessed directly. Additionally, the VMCS may include controls determining how state is managed during VM entries and VM exits and how the software in the VM operates, in addition to other controls. It will be apparent to one of ordinary skill in the art that other mechanisms and/or data structures may be used to define these policies.

Figure 4:
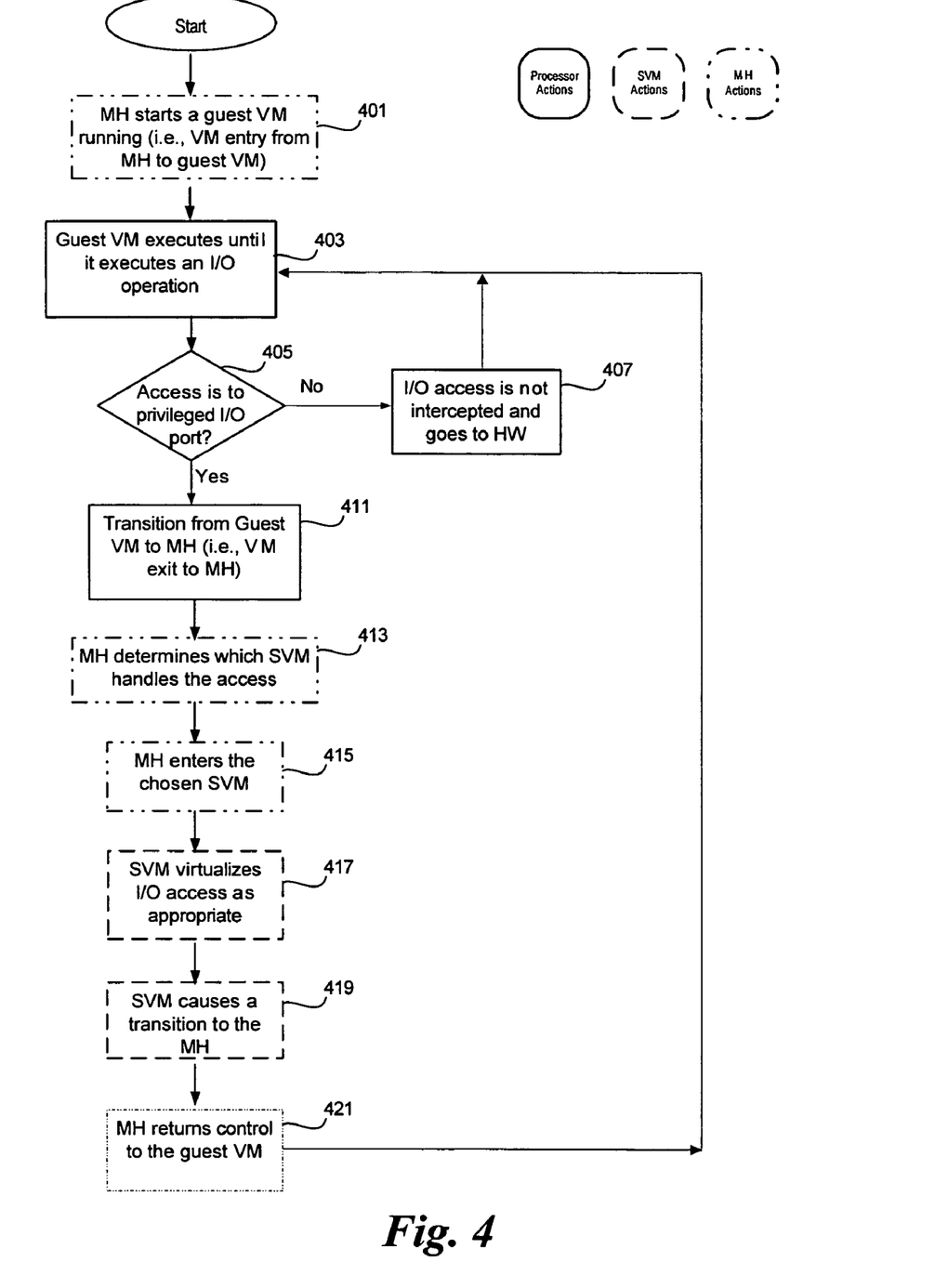
FIG. 4 is a flow diagram illustrating an exemplary method for service virtual machines with deprivileged access to handle input/output (I/O) operations, according to an embodiment of the invention.

FIG. 4 illustrates an exemplary process for deprivileged service virtual machines to handle input/output (I/O) operations, according to an embodiment of the invention. In a platform with hardware virtualization support, a micro-hypervisor (MH) launches a guest VM and transfers control to the guest VM in block 401 (i.e., performs a VM entry). The guest VM executes as expected until it attempts to execute an input/output (I/O) operation (block 403).

A determination is made as to whether the I/O operation requires access into a privileged I/O port, in block 405. As described above, a list of I/O ports requiring privileged access may be enumerated in a virtual machine control structure (VMCS), or other implemented structure. Access to an I/O port may cause a VM exit. If the access is not to a protected I/O port, then the I/O access is not intercepted and the access communicates directly with the hardware device in question, in block 407. Execution then continues in the guest VM (403) until another I/O operation is attempted in block 403.

It will be apparent to one of ordinary skill in the art that various hardware events, in addition to I/O, may be trapped in this fashion. In discussions that follow, any event that is made to cause a transition to the VMM is referred to as a "request for service". A transition to the VMM is referred to as a trap. The term "request for service" is used even if the guest VM is unaware of the VMM controlling it and hence believes that it is running directly on the platform hardware. The "service" provided by the micro-hypervisor and SVM(s) may include, for example, emulation of a platform device, or providing a higher level service. For example, in one embodiment, the SVM may provide facilities to establish and maintain shared memory buffers for inter-VM communication. In another embodiment, the SVM may provide file system functionality to guest VMs which are aware of the presence of the micro-hypervisor and SVM for improved system performance, security, reliability, etc. The request for service may be initiated by the guest VM executing an I/O instruction, accesses a protected segment of memory or explicitly communicating with the micro-hypervisor or SVM (for example through execution of an instruction to cause a VM exit). The remainder of the discussion with regard to FIG. 4 details handling of I/O access attempts, but it should now be understood that this is a specific example that in no way limits the applicability of the invention described herein. Note that VM exits from a SVM may be treated specially. For example, certain VM exits from a SVM may not require the interaction of a SVM (i.e., a second SVM) and may be handled directly in the micro-hypervisor. This is discussed further below.

If the I/O access attempt is to a privileged I/O port, then the platform transitions from guest VM execution to execution of the micro-hypervisor, in block 411. The micro-hypervisor identifies the event causing the VM exit and determines which service VM (SVM) should handle the I/O access, in block 413. The micro-hypervisor enters the chosen SVM with a VM entry to process the I/O access, in block 415.

The determination of the appropriate SVM to handle a particular request may be made based on a number of criteria. In one embodiment, there is a single SVM that handles all requests. In this case, the determination of the appropriate SVM for a request is trivial. In another embodiment, there are multiple SVMs each handling requests of a particular type. In such an embodiment, the micro-hypervisor must determine the type of request by examining processor or memory state or by examining the cause of the VM exit from the guest VM (provided, in an embodiment by the processor as part of the VM exit). Using this type information, the micro-hypervisor consults a mapping table or other data structure which maps request types to responsible SVM(s). In yet another embodiment, multiple SVMs may handle the same type of request. The micro-hypervisor may select between such a plurality of available SVMs based on load balancing, processor affinity or other selection criteria. In some embodiments, the contents of such a mapping table may be determined by one or more SVMs, with the micro-hypervisor acting only to enforce policies put in place by the SVMs.

The SVM virtualizes the I/O access as appropriate in block 417. There may be several SVMS, each handling different forms of I/O, or other services. Thus, execution of the SVM will not enable unauthorized access to other I/O devices on the platform. Once the virtualization of the requested I/O has been completed, the SVM causes control to transition back to the micro-hypervisor, in block 419. In an embodiment, this transition may be initiated by software in the guest VM executing a particular instruction or causing a particular event which causes a VM exit. The micro-hypervisor returns control to the guest VM, in block 421, after ensuring that results of the virtualized I/O are accessible by the guest VM, as discussed below. The guest VM continues normal execution in block 403 until a next I/O access attempt occurs.

In an embodiment, some events causing a transition from a guest VM to the micro-hypervisor will not result in a transition to a service VM. Some events may be handled in the micro-hypervisor for security or performance reasons. A service VM may configure the micro-hypervisor to perform functionality on its behalf. The micro-hypervisor implements the mechanism to support a policy specified by the service VM.

For example, frequently occurring events associated with virtualization of physical memory may be handled in the micro-hypervisor to facilitate improved system performance (by removing transitions to a service VM). For example, a particular service VM which is responsible for managing system memory may indicate that a particular guest VM has access to a set of pages of physical memory. The micro-hypervisor is then responsible for managing the guest VM's use of these pages of physical memory as necessary to provide proper functionality while preventing the guest VM from accessing memory not assigned to it. Depending on the algorithm used to implement the SVM-specified policy (i.e., the use of a certain set of pages), frequent transitions may occur from the guest VM to the micro-hypervisor as the guest accesses pages in physical memory. The micro-hypervisor may handle the events and return control to the guest VM without involving the service VM (and avoiding the latency of transitioning control to the service VM).

In an embodiment, the micro-hypervisor provides security functionality necessary to ensure the integrity of the virtual machine system without interactions with a service VM. For example, the translation of guest-physical addresses to host-physical addresses must be protected and hence performed by the micro-hypervisor. In another embodiment, the micro-hypervisor may intercede on all attempts to program direct memory access (DMA) controllers on the platform in order to assure that no physical addresses used for DMA are to protected or disallowed regions of memory. In these cases, the SVM is not activated to perform the translation, however, the SVM will be informed if the address cannot be translated.

In another embodiment, the micro-hypervisor may provide security mechanisms for use by guest VMs, without involvement of a SVM. For example, the micro-hypervisor may respond to service requests from guest VMs to encrypt packets of data. In one embodiment, the micro-hypervisor may not allow any VM, including any SVM, to access platform-based security devices, such as a trusted-platform module (TPM).

In an embodiment, the micro-hypervisor includes a limited number of device drivers and device models. This inclusion increases the size of the code running at the highest VM privileged level. However, this inclusion of device drivers and device models may provide large performance benefits for devices which are accessed frequently by guest VMs. For instance, the platform interrupt controller (e.g., for instance, the Intel® 82093AA I/O Advanced Programmable Interrupt Controller) may be accessed a number of times on each occurrence of a hardware interrupt. By including a device model and driver for the interrupt controller in the micro-hypervisor, transitions to a service VM (which could also provide this functionality) are reduced, improving system performance. By including a device model and driver for this device in the micro-hypervisor, a service VM is not required to make all scheduling and interrupt routing determinations, again improving system performance.

As part of providing the service in the SVM, the micro-hypervisor or SVM may need to provide results or data in some form to the guest VM requesting the service. For example, in emulating a device accessed by a guest VM using an I/O instruction, the SVM or micro-hypervisor may provide results to the guest VM by returning the expected values in processor registers or in memory to the guest VM such that the guest VM may access the results as provided by the processor ISA. For example, in the IA-32 ISA, an IN instruction may be used to access an I/O device (i.e., to read a value from the I/O device). In the IA-32 ISA, the results of the IN instruction may be returned in a processor register or in a memory location given as an operand of the IN instruction, depending on the specific form of the IN instruction used. The SVM or micro-hypervisor would emulate this characteristic of the ISA before returning control to the guest VM. If the service being provided by the SVM is more complex, data or results may be returned through locations in memory or using any other mechanism known in the art.

Figure 5:
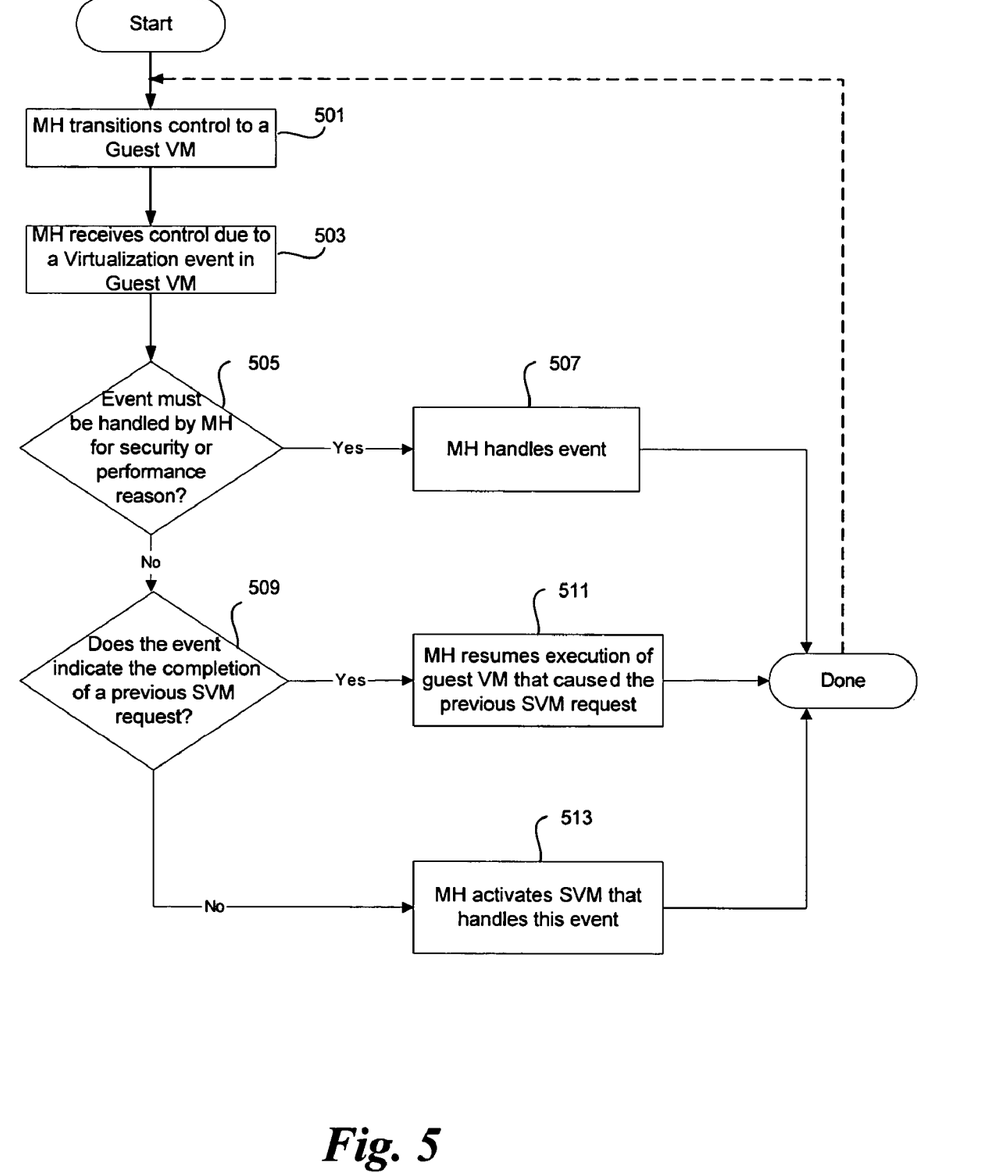
FIG. 5 is a flow diagram illustrating an exemplary method performed by a micro-hypervisor, according to an embodiment of the invention.

FIG. 5 illustrates an exemplary process for handling virtualization events directly in a micro-hypervisor, according to an embodiment of the invention. In an exemplary embodiment, the micro-hypervisor transitions control to a guest VM (501). In one embodiment, this transition is initiated by the micro-hypervisor by executing a processor instruction. The micro-hypervisor may wait for a VM exit to perform requested services or continue to operate periodically to perform normal monitoring functions.

When a virtualization event (e.g., a hardware interrupt occurs, the guest VM requests access to a controlled device or memory location, or requests a selected system service that is designated to generate a virtualization event) a VM exit may be generated. The micro-hypervisor then receives control due to this virtualization event (503).

The micro-hypervisor determines whether the virtualization event is to be handled directly by the micro-hypervisor, typically for security or performance purposes, in 505. If the micro-hypervisor is to handle the virtualization event, then the event is handled in 507 and control may then be returned to the guest VM (501). In one embodiment, this return of control to the guest VM is initiated by the micro-hypervisor executing a VM enter instruction.

In some cases, the virtualization event may be a completion notification from a SVM. Since SVMs execute in guest VMs, they may transfer control to the micro-hypervisor in the same fashion (typically VM exit which may be caused by the SVM explicitly executing an instruction designed to cause a VM exit) as other guest VMs. The micro-hypervisor determines whether the event indicates a completion of a previous SVM request in 509. If the virtualization event indicates completion of a previous SVM request, the micro-hypervisor transfers any necessary data or results, as described above, to the guest VM that caused the original SVM request (511). This transition is typically performed by execution of a VM enter instruction.

If the virtualization event is not a SVM completion event, but a new service or access request, the micro-hypervisor activates the appropriate SVM to handle the event (513). This transition is typically a VM enter, as the SVM executes in a guest VM.

It should be apparent to one skilled in the art that other actions are possible by the micro-hypervisor. For example, the micro-hypervisor, if it handles scheduling of guest VM execution, may choose to schedule a different guest VM instead of activating the SVM to handle the event in 513, rather deferring this request in favor of giving another guest VM execution time. The micro-hypervisor may take this course of action if, for example, the SVM is blocked waiting for other requests and can not handle the new request immediately. Alternatively, the micro-hypervisor may perform this scheduling if a guest VM with higher priority is awaiting execution (e.g., a real-time guest VM).

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations having support for virtualization in hardware, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer system to deprivilege components of a virtual machine monitor executing on a computing platform, comprising:
a platform having a plurality of instruction set architecture (ISA) privilege levels, the platform including hardware virtualization support having a plurality of virtual machine (VM) privilege levels, the platform configured to transition among processes running in the VM privilege levels;
a micro-hypervisor portion of a virtual machine monitor (VMM) to run at a highest one of the VM privilege levels on the platform, the highest one of the VM privilege levels being a root level privilege, wherein program execution on the platform is configured to automatically transfer to the micro-hypervisor in response to selected trapped events occurring in a virtual machine associated with the hardware virtualization support; and
at least one service virtual machine (SVM) portion of the VMM to run at a lower VM privilege level than the VM privilege level operated in by the micro-hypervisor, the lower VM privilege level being a non-root level privilege, wherein the micro-hypervisor is to transfer program execution on the platform to the at least one SVM for handling of at least one of the selected trapped event events, and wherein the VMM is to run in different ones of the VM privilege levels independent of the ISA privilege levels.

2. The system as recited in claim 1, wherein a first operating system running in a first guest virtual machine on the platform runs at a VM privilege level lower than the VM privilege level operated in by the micro-hypervisor.

3. The system as recited in claim 2, wherein a trapped event is caused when guest software running under the first operating system requests a service.

4. The system as recited in claim 3, wherein at least one portion of the first operating system operates at a highest ISA privilege level of the platform.

5. The system as recited in claim 2, further comprising a plurality of additional operating systems, each additional operating system to run in a respective additional virtual machine, the plurality of operating systems to run at a VM privilege level lower than the VM privilege level operated in by the micro-hypervisor.

6. The system as recited in claim 1, wherein the at least one SVM is restricted in access to a selected at least one component.

7. The system as recited in claim 1, where the micro-hypervisor is launched as a driver from a booting operating system.

8. The system as recited in claim 1, wherein the micro-hypervisor resides in system firmware communicatively coupled to the platform.

9. The system as recited in claim 1, wherein the micro-hypervisor is loaded during system boot.

10. The system as recited in claim 1, wherein the at least one SVM provides services for hardware interactions.

11. The system as recited in claim 1, wherein the highest one of the VM privilege levels on the platform is higher than a highest one of the ISA privilege levels on the platform.

12. A method for deprivileging services in a virtual machine monitor (VMM) executing on a computing platform having a plurality of instruction set architecture (ISA) privilege levels, the platform including hardware virtualization support having a plurality of virtual machine (VM) privilege levels, comprising:
transitioning control, from a micro-hypervisor portion of a VMM executing at a highest one of the VM privilege levels, to a guest virtual machine (VM) in the platform, the guest VM to execute at a lower VM privilege level than the VM privilege level operated in by the micro-hypervisor, wherein the highest one of the VM privilege levels is a root level privilege and the lower VM privilege level is a non-root level privilege;

receiving control by the micro-hypervisor in response to a trapped event occurring in the guest VM;

selecting by the micro-hypervisor one of a plurality of service virtual machines (SVMs) of the VMM to handle the trapped event;

transitioning control to the selected SVM for the trapped event, wherein the SVM is to execute at a lower VM privilege level than the VM privilege level operated in by the micro-hypervisor; and initiating execution of the selected SVM to service the trapped event;

transitioning back to the micro-hypervisor upon completing service to the trapped event; and returning control, by the micro-hypervisor, to the guest VM.

13. The method as recited in claim 12, wherein the selected SVM is a portion of the micro-hypervisor and the trapped event is handled locally by the micro-hypervisor without explicitly transitioning control to a second VM.

14. The method as recited in claim 12, wherein trapping of events is enabled by the hardware virtualization support.

15. The method as recited in claim 12, further comprising, prior to transitioning control to the guest virtual machine, enumerating at least one event type to be trapped in a virtual machine control structure (VMCS), the VMCS comprising a set of controls that specifies for each type of event, whether the event type is to cause a transition to the micro-hypervisor.

16. The method as recited in claim 12, wherein transitioning control among the micro-hypervisor, guest VM and SVM is enabled by the hardware virtualization support.

17. A machine accessible storage medium for depriveleging services in a virtual machine monitor executing on a computing platform having a plurality of instruction set architecture (ISA) privilege levels, the platform including hardware virtualization architecture support having a plurality of virtual machine (VM) privilege levels, the medium having instructions stored thereon that when executed on the platform cause the platform to:

transition control, from a micro-hypervisor portion of a VMM executing at a highest one of the VM privilege levels, to a guest virtual machine (VM) in the platform, the guest VM to execute at a lower VM privilege level than the VM privilege level operated in by the micro-hypervisor, wherein the highest one of the VM privilege levels is a root level privilege and the lower VM privilege level is a non-root level privilege;

receive control by the micro-hypervisor in response to a trapped event occurring in the guest;

select by the micro-hypervisor one of a plurality of service virtual machines (SVMs) of the VMM to handle the trapped event;

transition control to one-of the selected SVM, wherein the SVM is to execute at a lower VM privilege level than the VM privilege level operated in by the micro-hypervisor; and initiate execution of the selected SVM to service the trapped event;

transition back to the micro-hypervisor upon completing service to the trapped event; and return control, by the micro-hypervisor, to the guest VM.

18. The machine accessible storage medium as recited in claim 17, wherein trapping of events is enabled by the hardware virtualization support.

19. The machine accessible storage medium as recited in claim 17, further comprising instructions that when accessed cause the machine to, prior to transitioning control to the guest virtual machine, enumerate at least one event type to be trapped in a virtual machine control structure (VMCS), the VMCS comprising a set of controls that specifies for each type of event, whether the event type is to cause a transition to the micro-hypervisor.

20. The machine accessible storage medium as recited in claim 17, wherein transitioning control among the micro-hypervisor, guest VM and SVM is enabled by the hardware virtualization support.

21. A computer system to deprivilege components of a virtual machine monitor executing on a computing platform, comprising:

a platform having a plurality of instruction set architecture (ISA) privilege levels, the platform including hardware virtualization support having a plurality of virtual machine (VM) privilege levels, the platform configured to transition among a first process and a second process running in the VM privilege levels;

a micro-hypervisor portion of a virtual machine monitor (VMM) to run at a highest one of the VM privilege levels on the platform, the highest one of the VM privilege levels being a root level privilege, wherein program execution on the platform is to automatically transfer to the micro-hypervisor in response to selected trapped events occurring in a virtual machine associated with the hardware virtualization support; and at least one service virtual machine (SVM) portion of the VMM to run at a lower VM privilege level than the VM privilege level operated in by the micro-hypervisor, the lower VM privilege level being a non-root level privilege, wherein the micro-hypervisor is to transfer program execution on the platform to the at least one SVM for handling of at least one of the selected trapped events, and wherein a highest one of the VM privilege levels is higher than a highest one of the ISA privilege levels.

* * * * *